United States Patent [19]

Cohen

[11] Patent Number: 5,400,973
[45] Date of Patent: Mar. 28, 1995

[54] PRESSURE RESPONSIVE REGULATED FLOW RESTRICTOR USEFUL FOR DRIP IRRIGATION

[76] Inventor: Amir Cohen, 20 142, Yuvalim, Israel

[21] Appl. No.: 99,509

[22] Filed: Jul. 30, 1993

[51] Int. Cl.$^6$ .......................... B05B 1/02; B05B 15/00
[52] U.S. Cl. ................... 239/533.1; 239/542; 239/547
[58] Field of Search ............... 239/107, 533.1, 533.13, 239/542, 547, 566, 567

[56] References Cited

U.S. PATENT DOCUMENTS

| | | | |
|---|---|---|---|
| 3,998,427 | 12/1976 | Bentley | 239/542 X |
| 4,177,946 | 12/1979 | Sahagun-Barragan | 239/533.1 |
| 4,366,926 | 1/1983 | Mehoudar | 239/542 |
| 4,502,631 | 3/1985 | Christen | 239/542 X |
| 4,687,143 | 8/1987 | Gorney et al. | 239/542 |
| 4,728,042 | 3/1988 | Gorney et al. | 239/542 |
| 4,817,875 | 4/1989 | Karmeli et al. | 239/547 X |
| 5,111,996 | 5/1992 | Eckstein | 239/547 X |
| 5,236,130 | 8/1993 | Hadar | 239/547 X |

*Primary Examiner*—William Grant
*Attorney, Agent, or Firm*—Benjamin J. Barish

[57] ABSTRACT

A drip irrigation emitter includes a plurality of baffles defining a labyrinth in which the baffles form clearances of different heights with respect to one of the housing walls, and in which either the housing wall or the baffles are displaced to open or close the clearances sequentially, thereby varying the resistance of the labyrinth to the flow of fluid therethrough in response to variations in the pressure of the fluid at the housing inlet.

20 Claims, 8 Drawing Sheets

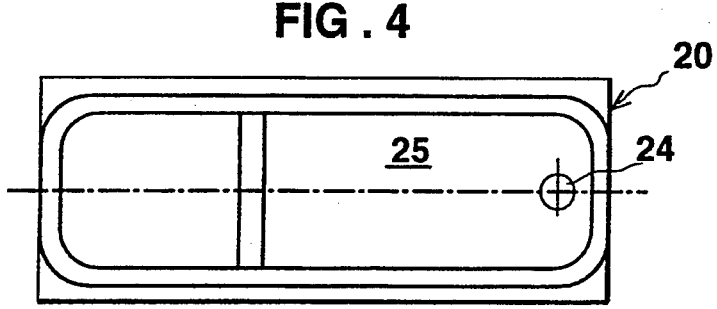
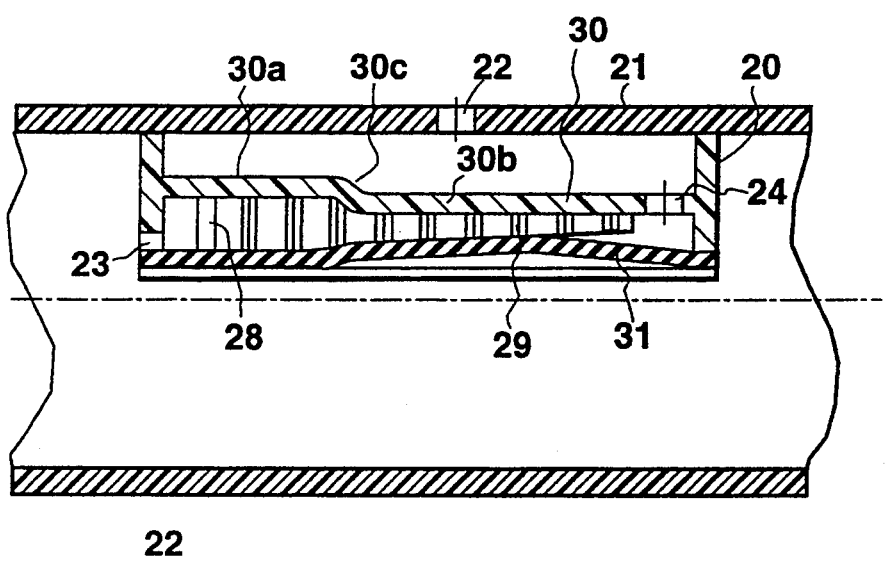
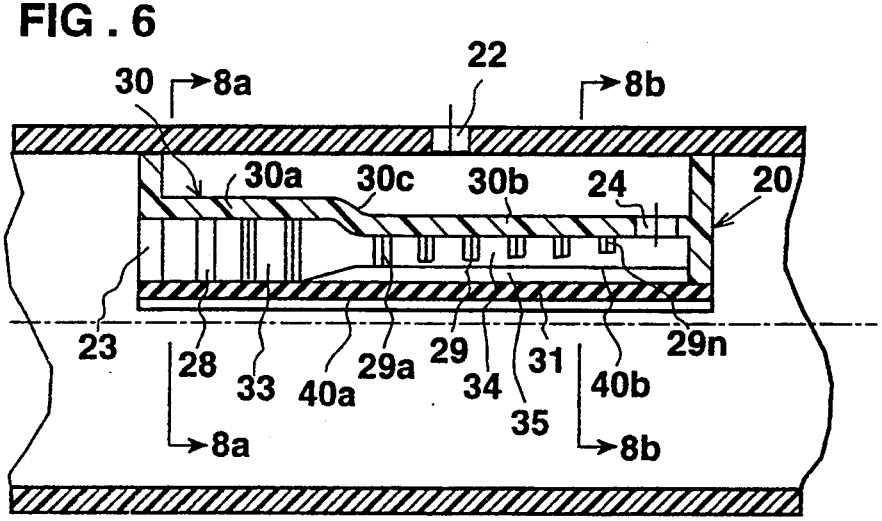

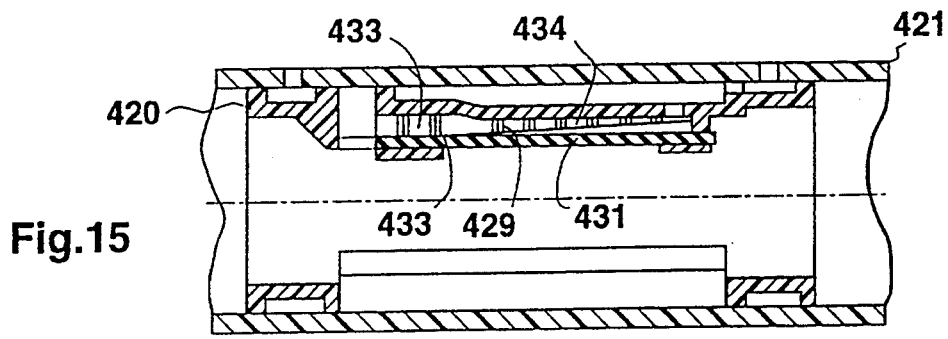
Fig.15
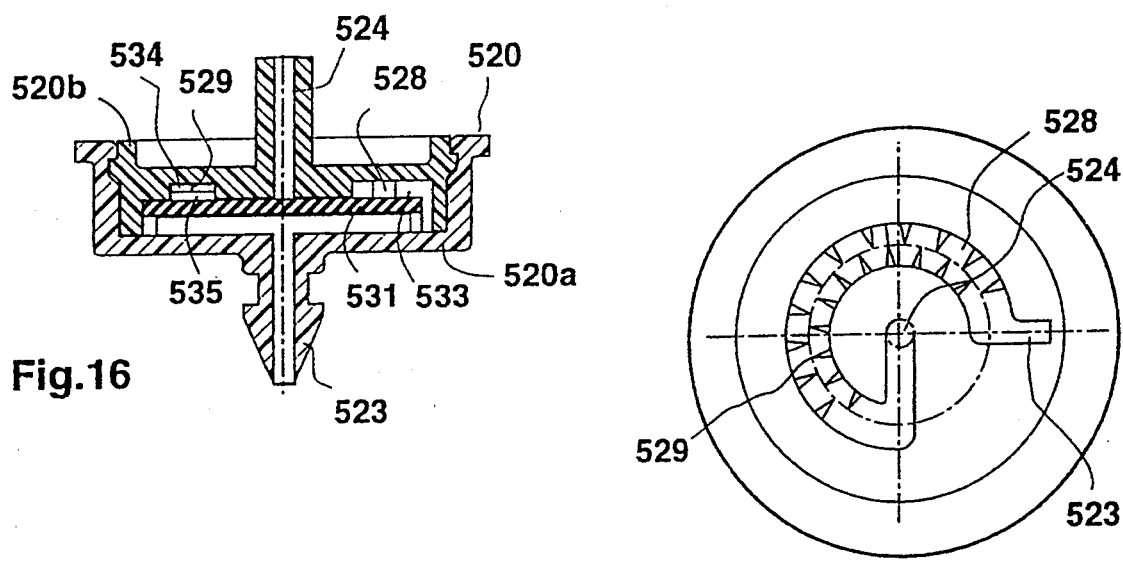
Fig.16
Fig.17
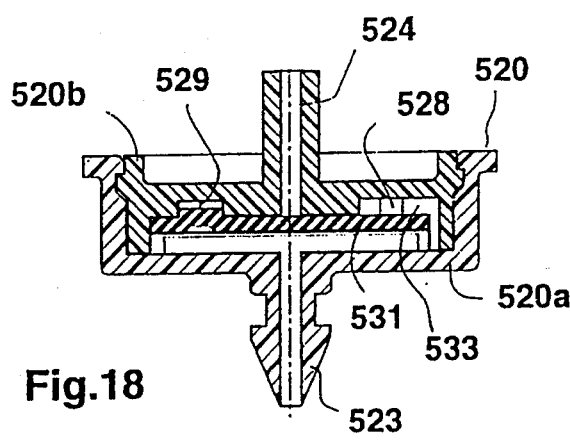
Fig.18

PRESSURE RESPONSIVE REGULATED FLOW RESTRICTOR USEFUL FOR DRIP IRRIGATION

FIELD AND BACKGROUND OF THE INVENTION

The present invention relates to a regulated flow restrictor device. The invention is particularly useful for drip irrigation emitters, and is therefore described below with respect to this application.

Drip irrigation systems have come into widespread use for irrigating plants since they supply a minimum of water directly to the root region of the plants. Regulated emitters have also come into widespread use since they produce a fairly uniform output despite variations in the inlet pressure, and thereby enable drip irrigation lines to be of relatively long lengths and to be used over uneven terrain.

Many techniques have been developed for regulating emitters. Some involve varying the cross-section of a labyrinth in response to changes in the inlet pressure; whereas others involve varying the cross-section of a control chamber or of an outlet port in response to changes in the inlet pressure. Another proposed technique, as described in Eckstein U.S. Pat. No. 5,111,996, varies the effective length of a labyrinth in response to changes in the outlet pressure.

OBJECTS AND BRIEF SUMMARY OF THE INVENTION

An object of the present invention is to provide a novel structure for a regulated flow restrictor device, and particularly for a drip irrigation emitter, which has a number of important advantages over the existing structures, as will be described more particularly below.

According to the present invention, there is provided a regulated flow restrictor device particularly useful as a drip irrigation emitter, comprising a housing having an inlet opening connectible to a source of pressurized fluid, an outlet opening, and a passageway including first and second opposed walls connecting the inlet opening to the outlet opening; one of the walls being displaceable towards and away from the other wall; and a plurality of baffles extending transversely of, and longitudinally spaced between, the first and second walls to define a flow-restrictor imposing a resistance to the flow of the fluid through the passageway in order to restrict the flow therethrough. The baffles define clearances with the passageway walls which clearances, by the displacement of the displaceable walls, vary the resistance of the flow of the fluid through the passageway in response to variations in the pressure of the pressurized fluid. The clearances are of increasing height in the direction from one of said openings towards the other of said openings such that the clearances are sequentially closed, with increasing pressure of the pressurized fluid, to maintain a substantially uniform flow to and through the housing outlet in response to variations in the pressure of the pressurized fluid.

In the described preferred embodiment, the clearances are of increased height in the direction from the housing inlet opening towards the housing outlet opening.

According to another aspect of the present invention, there is provided a regulated flow restrictor device useful as a drip irrigation emitter, comprising a housing having an inlet connectible to a source of pressurized fluid, an outlet, and a passageway including first and second opposed walls connecting the inlet to the outlet; a plurality of baffles extending transversely of, and longitudinally spaced between, the first and second walls to define a flow-restrictor imposing a resistance to the flow of fluid through the passageway in order to restrict the flow therethrough. The baffles are carried by the first passageway wall and terminate short of the second passageway wall to define clearances therebetween. The second passageway wall is an elastomeric membrane which is displaceable with respect to the first passageway wall and the baffles carried thereby in response to variations in the pressure of the pressurized fluid. The housing is formed with a longitudinally-extending cavity occupied by the baffles; and the elastomeric membrane is secured over the cavity such that the membrane overlies the baffles and defines the clearances with respect to the baffles. The housing is further formed at the opposite sides of the cavity with longitudinally-extending edges to which the opposite edges of the membrane are secured and with an inclined surface inclined from each of the longitudinally-extending edges towards the cavity such that the complete membrane between its opposite edges is initially displaceable towards the baffles until contacting the inclined surfaces, and then only the portion thereof between the inclined surfaces is displaceable towards the baffles.

According to a still further aspect of the invention, there is provided a regulated flow restrictor device particularly useful as a drip irrigation emitter, comprising a housing having an inlet connectible to a source of pressurized fluid, an outlet, and a passageway including first and second opposed walls connecting the inlet to the outlet; a plurality of baffles extending transversely of, and longitudinally spaced between, the first and second walls to define a flow-restrictor imposing a resistance to the flow of the fluid through the passageway in order to restrict the flow therethrough; and pressure-responsive means for controlling the resistance of the flow restrictor to the flow of the fluid therethrough in response to variations in the pressure of the fluid at the housing inlet. The pressure-responsive means includes clearances between the baffles and one of the passageway walls, and means for effecting relative displacement between the one passageway wall and the baffles to increase or decrease the clearances, and thereby to vary the resistance of the flow restrictor to the flow of fluid therethrough in response to variations in the pressure of the fluid at the housing inlet. The plurality of baffles define a first labyrinth, and the passageway includes a second labyrinth defined by another plurality of baffles extending transversely of, and longitudinally spaced between, the first and second passageway walls. The second labyrinth is at the inlet side of the first labyrinth, and the baffles of the second labyrinth extend completely across the first and second passageway walls such that the resistance to the flow of the fluid imposed by the second labyrinth is not affected by variations in the pressure at the housing inlet.

It will be seen that the regulated flow restrictor device of the present invention provides a flow restrictor including baffles defining clearances which are controlled in response to variations in the inlet pressure, to vary the resistance of the flow restriction to the flow of the fluid therethrough. The device of the present invention is therefore inherently capable of providing more continuous and uniform regulation of the outlet flow in response to variations in the inlet pressure. Moreover, such a regulated flow restrictor device may be provided with relatively large passageways, thereby reducing the sensitivity of the device to clogging. Further, since all the baffles are subjected to the flow even when the inlet pressure is relatively low such as occurring at the start and finish of an irrigation operation, the novel construction is inherently capable of self-flushing itself during irrigation, and particularly at the start and end of an irrigation operation.

Further features and advantages of the invention will be apparent from the description below.

BRIEF DESCRIPTION OF THE DRAWINGS

The invention is herein described, by way of example only, with reference to the accompanying drawings, wherein:

FIG. 4 is a top plan view of the emitter housing of FIG. 1;

FIG. 5 is a view similar to that of FIG. 1 but illustrating the condition of the emitter when subjected to a high inlet pressure;

FIGS. 6, 7 and 8 are views corresponding to FIGS. 1, 2 and 3a illustrating another form of drip irrigation emitter constructed in accordance with the present invention;

FIGS. 8a and 8b are sectional views along lines 8a and 8b of FIG. 6; whereas

FIG. 15 is a view similar to that of FIG. 14 but illustrating a modification in the construction of the emitter;

FIG. 16 is a sectional view illustrating a still further form of drip irrigation emitter constructed in accordance with the present invention;

FIG. 17 is a plan view illustrating the baffle construction in the emitter of FIG. 16;

and FIG. 18 is a view similar to that of FIG. 16 but illustrating the condition of the emitter when subjected to a high inlet pressure.

DESCRIPTION OF PREFERRED EMBODIMENTS

Figure 1:
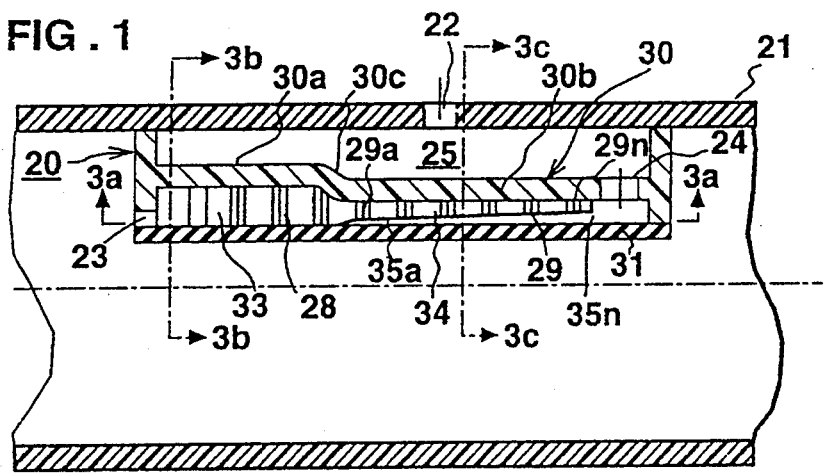
FIG. 1 is a sectional view illustrating one form of drip irrigation emitter constructed in accordance with the present invention.
Figure 2:
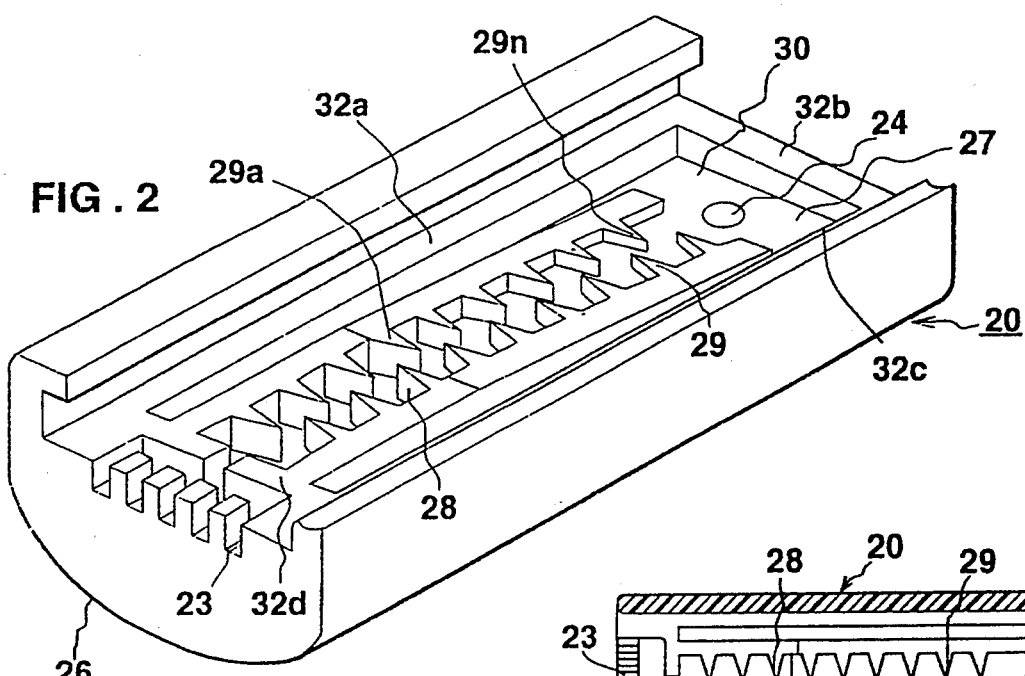
FIG. 2 is a three-dimensional view more particularly illustrating the construction of the housing of the emitter unit of FIG. 1.
Figure 3A:
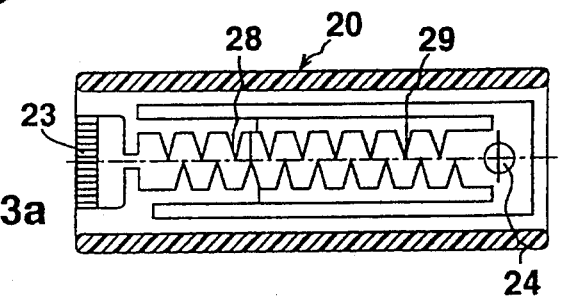
FIGS. 3a, 3b and 3c are sectional views along lines 3a, 3b and 3c of FIG. 1.
Figure 3B:
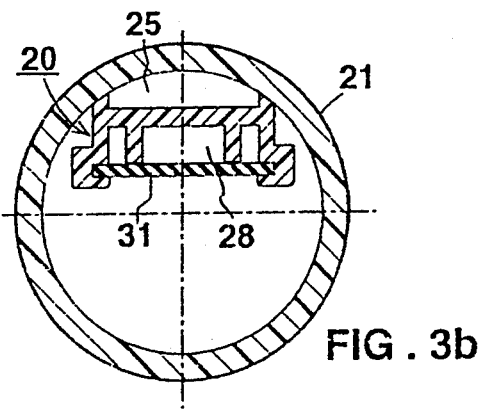
Figure 3C:
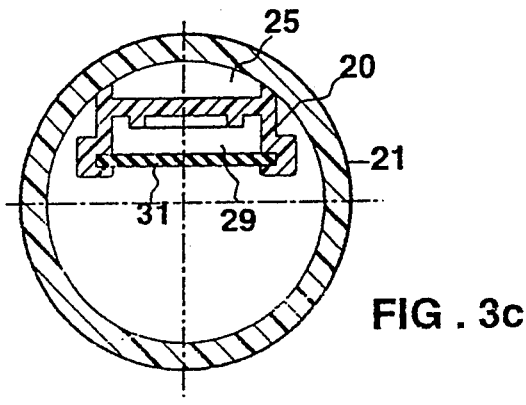

The drip irrigation emitter illustrated in FIGS. 1-5 of the drawings includes a housing 20 in the configuration of a linear strip and is bonded to the inner face of the water supply tube 21 pierced with an outlet opening 22. The emitter housing 20 is formed with an inlet opening 23 communicating with the interior of the water supply tube 21, and an outlet 24 communicating with the tube outlet opening opening 22 via an outlet chamber 25. The outer surface of emitter housing 20 is rounded, as shown at 26 (FIG. 2), to conform to the curvature of the inner face of tube 21 to which it is bonded.

The inner face of housing 20 is formed with a cavity 27 which includes two groups of baffles 28, 29 integrally formed with wall 30 of the housing defining one side of its cavity 27. The opposite side of cavity 27 is defined by an elastomeric membrane 31 fixed, as by adhesive, to ledges 32a, 32b, 32c and 32d, circumscribing the cavity 27.

It will thus be seen that wall 30 and elastomeric membrane 31 of the housing 20 define a passageway between the inlet opening 23 and the outlet opening 24, and that this passageway includes two labyrinths: labyrinth 33 defined by baffles 28 between wall 30 and membrane 31; and labyrinth 34 defined by baffles 29 between wall 30 and membrane 31.

Baffles 28 are of the same thickness and extend the complete space between wall 30 and membrane 31. Baffles 29 are of uniformly decreasing thickness, decreasing towards the outlet 24 as shown by baffles 29a-29n in FIGS. 1 and 2; these baffles thereby define, with respect to membrane 31, clearances of increasing height towards the outlet 24, as shown by clearances 35a-35n in FIG. 1.

As also shown in FIG. 1, section 30a of housing wall 30 occupied by baffles 28 is spaced a greater distance from membrane 31 than housing wall section 30b occupied by baffles 29; the two housing sections are connected by a step 30c.

It will be appreciated that a plurality of emitter units, each including a housing 20 and a membrane 31 bonded thereto to define the two labyrinths 33 and 34 between inlet opening 23 and outlet opening 24, are bonded to the inner surface of the water supply tube 21 at spaced intervals along its length, and that the water supply tube is provided with a discharge hole 22 in communication with the outlet chamber 25 of each emitter unit.

The emitter illustrated in FIGS. 1-5 operates as follows:

When the water supply pressure within the tube 22 is low, membrane 31 will be in the position illustrated in FIG. 1. In this position, the membrane engages the outer surfaces of baffles 28, but not the outer surfaces of baffles 29, so that the baffles 28 of labyrinth 33, adjacent to the inlet opening 23, will be fully effective to restrict the flow of the water. However, baffles 29 in labyrinth 35 will be only partially effective in restricting the water flow, since their clearances 35a-35n will substantially reduce the resistance of the water flow through this labyrinth section.

Now, as the pressure within the tube increases, membrane 31 will be deflected towards housing wall section 30b, as shown in FIG. 5. The initial deflection will cause it to engage only the outer surface of the leftmost baffle 29a, i.e., the one adjacent the step 30c. When membrane 31 thus contacts baffle 29a, that baffle will be fully effective to increase the resistance to the flow, but all the baffles downstream thereof towards the outlet opening 24 will still be only partially effective, and therefore only a slight increase in the flow restriction will be produced. However, as the pressure within tube 22 increases, membrane 31 will be deflected more and more towards wall section 30b, thereby closing more and more of the clearances between it and the outer surfaces of baffles 29, thereby making these downstream baffles more and more effective to restricting the flow.

The large spacing between wall section 30a and the membrane 31 in the inlet labyrinth 33 assures that there will be a relatively low drop in flow when pressurized water is first applied to the housing inlet opening 23, so that the outlet flow will quickly build up to the regulated value. As soon as the regulated value is reached, membrane 31 will begin to deflect, in response to increases in the inlet pressure, to successively close the clearances between it and baffles 29 in the outlet labyrinth 34, and thereby to maintain a relatively constant output flow under increasing inlet pressures.

The construction illustrated in FIGS. 1–5 enables the drip irrigation emitter to have relatively large passageways during even high pressure conditions, thereby decreasing the sensitivity of the emitters to clogging by particles in the irrigation water. In case the passageway does become clogged by a large particle, the pressure will build up at the inlet side of the particle until membrane 31 deflects to release the particle and to wash it out through the outlet openings 24 and 22, both of which may be very large. The closing of each of the clearances 35a–35n, in response to an increase in the inlet pressure, introduces a small change in the effective resistance imposed by the baffle whose clearance was closed, as well as in all the other baffles downstream thereof, to the flow through labyrinth section 34, thereby providing a relatively smooth and uniform regulation of the outlet flow. Further, even under very low pressure conditions wherein the labyrinth 34 imposes a very low resistance to restrict the flow, all the spaces within this labyrinth still communicate with the water opening flow to the outlet 24, thereby effecting a self-rinsing of both labyrinths, both at the start, and at the end, of a water irrigation operation, thereby keeping these passages relatively clean.

Figure 7:
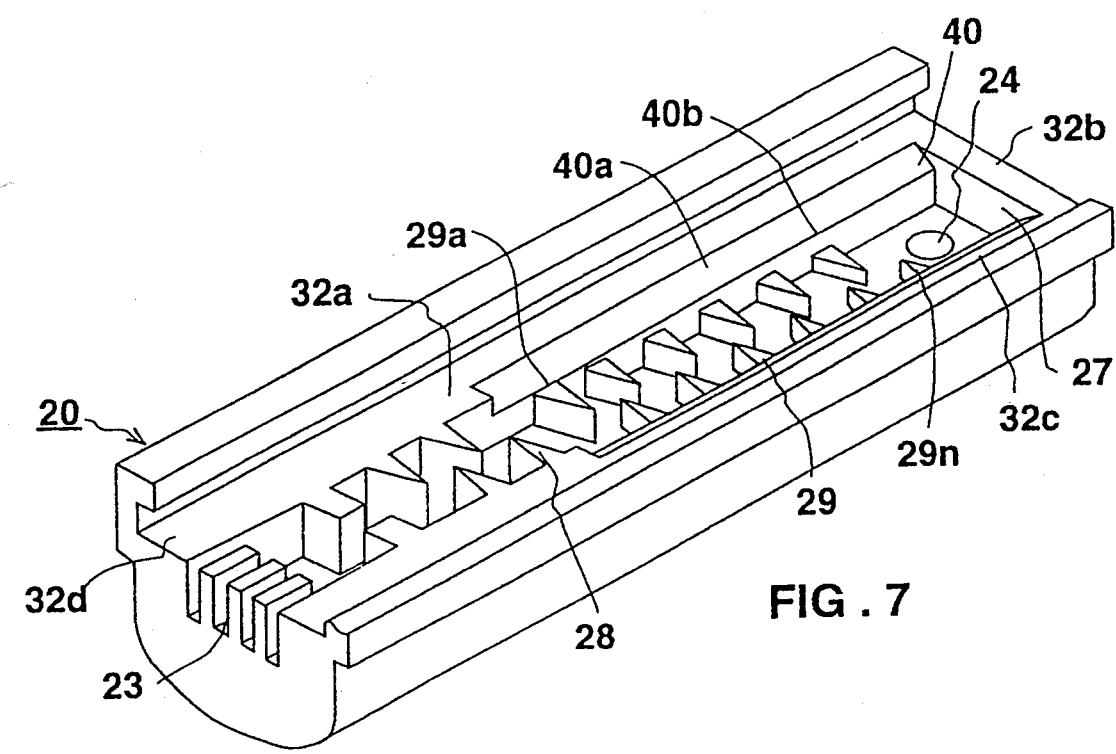
Figure 8:
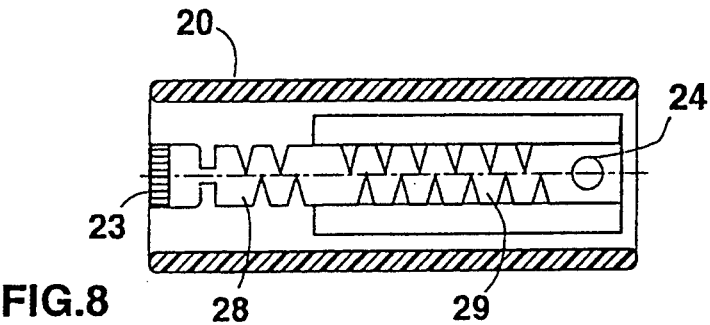

FIGS. 6–8 illustrate a construction similar to that of FIGS. 1–5, except that each of the ledges 32a, 32c, on opposite sides of the cavity 27, is formed with an inclined surface for the length of the cavity occupied by the baffles 29 of the labyrinth 34. The surfaces 40, thereby define an outer edge 40a adjacent to its respective ledge 32a (or 32c), and an inner edge 40b adjacent to the cavity 27. The arrangement is such that, initially, the complete membrane 31 between the outer edges 40a of the inclined surfaces 40 on the opposite sides of the cavity is displaced towards the baffles 29 until the membrane contacts the inclined surface 40, and thereafter, only the portion of the membrane between the inner edges 40b of the two inclined surfaces is displaced towards the baffles 29. The outer edge of the baffle 29 having the smallest clearance, i.e., baffle 29a closest to the step 30c in wall 30, is located at the inner edge 40b of the inclined surface 40 adjacent to cavity 27.

Figure 8A:
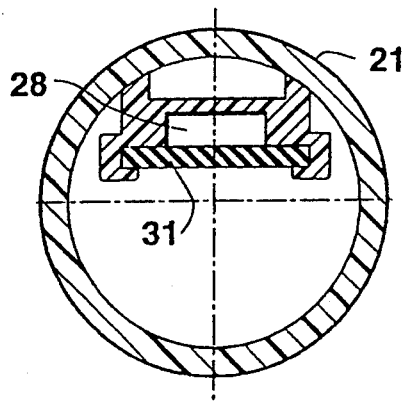
Figure 8B:
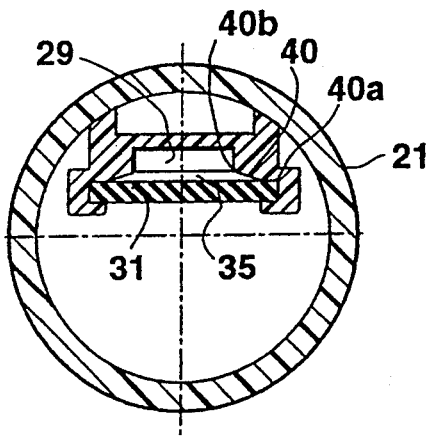

The operation of the construction illustrated in FIGS. 6–8 is more particularly shown in FIGS. 8a–8d. Thus, under initial or low pressure conditions, the membrane 31 assumes the position as illustrated in FIGS. 8a and 8b; FIG. 8a illustrates the membrane in direct contact with baffles 28 of the inlet labyrinth 33; whereas FIG. 8b illustrates membrane 31 spaced by clearances 35 from the outer edges of baffles 29 in the outlet labyrinth 34.

Figure 8C:
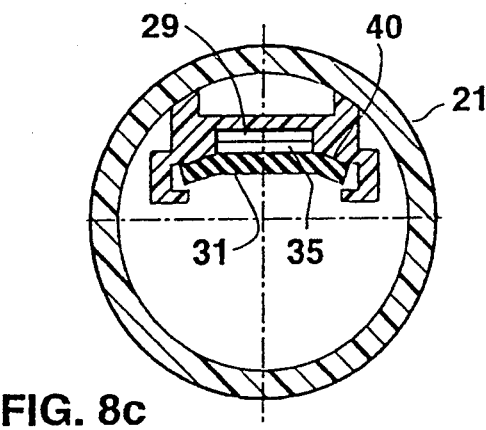
FIGS. 8c and 8d are views similar to FIG. 8b but under increased pressure conditions at the housing inlet.
Figure 8D:
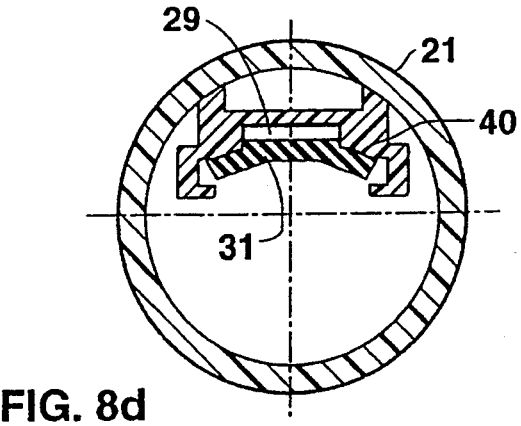

As the inlet pressure increases, the portion of membrane 31 overlying baffles 29 in the outlet labyrinth 34 is first deflected by the inlet pressure to close the clearance 35a (FIG. 1) with respect to the innermost baffle 29a of labyrinth 34, as described above with respect to FIGS. 1–5, and as shown in FIG. 8c. At this time, the membrane also is pressed against the inclined surfaces 40 so that it contacts edges 40b of those surfaces adjacent to cavity 27, as also seen in FIG. 8c. Now, with a further increase in pressure, only the portion of the membrane between edges 40b of inclined surfaces 40 will be deflected towards the baffles 29 to successively close their clearances, and thereby to successively increase the resistance imposed by those baffles to the flow of the water through labyrinth 34 to the outlet opening 24.

The construction illustrated in FIGS. 6–8 further reduces the resistance to flow when pressurized water is first applied to the housing inlet opening 23, so that the outlet flow will quickly build up to the regulated value, and will thereafter be regulated to maintain a relatively constant output flow under increasing inlet pressures. This is because the diaphragm will tend to deflect for its complete surface between the outer edges 40a of the inclined surfaces 40, thereby imposing a low resistance to the flow, but as soon as the diaphragm contacts the inner edges 40b of the inclined surfaces 40, only the portion of the diaphragm between these edges 40b will deflect into the cavity 27, which results in smaller deflections for larger pressures. Inclined surfaces 40 are preferably designed to produce the desired regulated flow at inlet pressures from 0.2 to 1.0 atmospheres, preferably about 0.5 atmospheres, thereby enabling the drip irrigation emitter to be supplied with relatively low line line pressures.

Figure 9A:
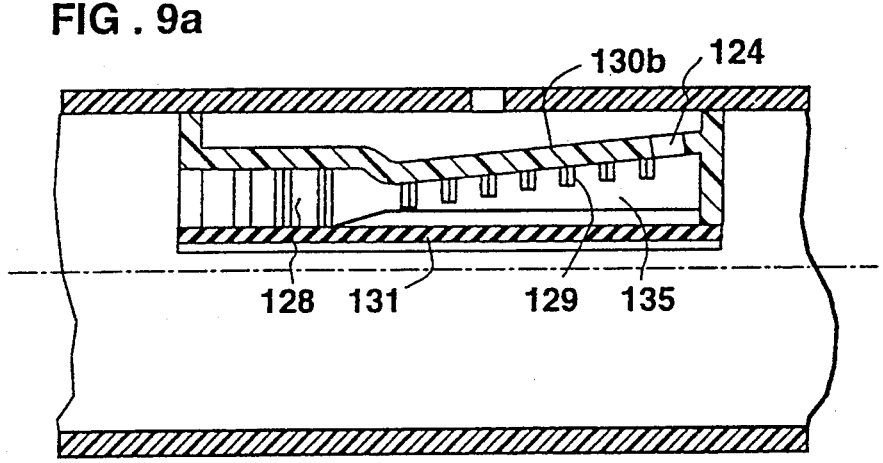
FIGS. 9a, 9b and 9c are views similar to those of FIGS. 1 and 7 but illustrating three different conditions with respect to another emitter constucted in accordance with the invention.
Figure 9B:
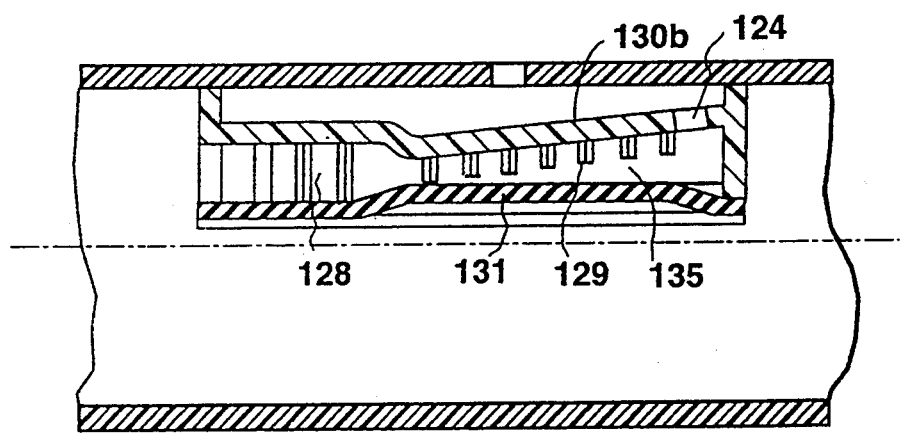
Figure 9C:
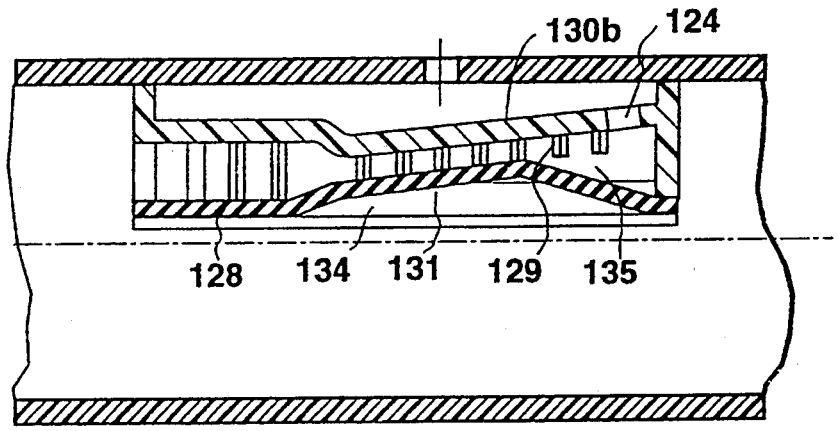
Figure 10:
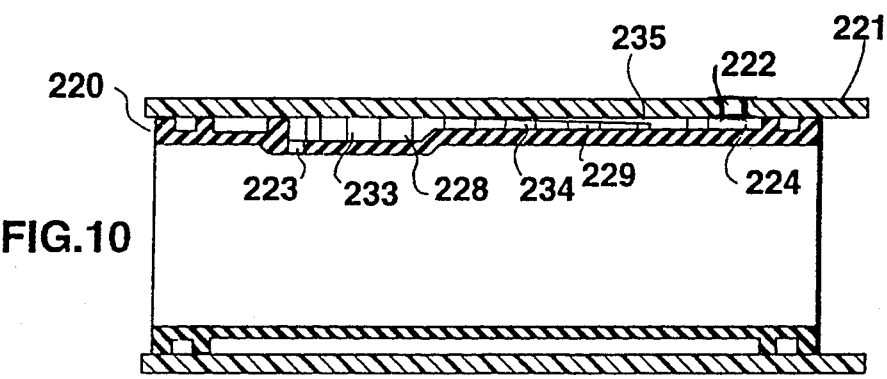
FIG. 10 is a longitudinal sectional view illustrating a further type of drip irrigation emitter constructed in accordance with the present invention.
Figure 11:
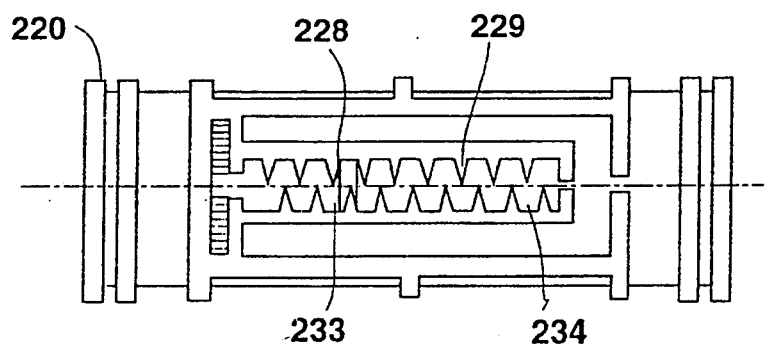
FIG. 11 is a top plan view illustrating only the emitter unit of FIG. 10.
Figure 12:
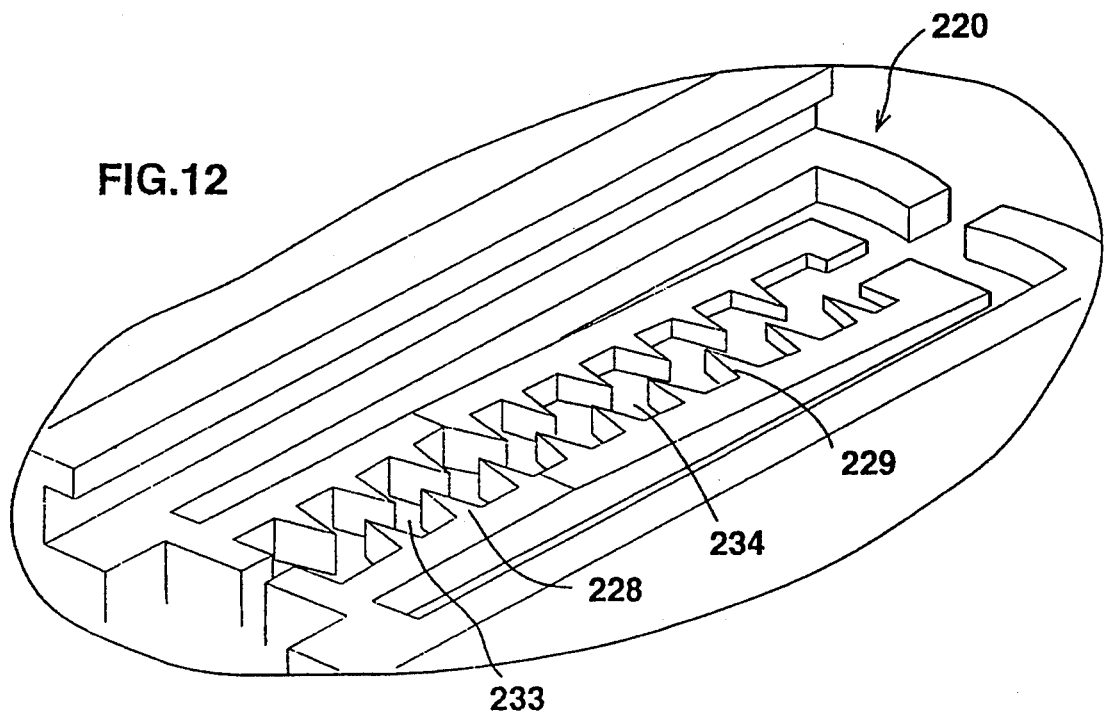
FIGS. 12 and 13 are enlarged fragementary views more particularly illustrating the construction of the emitter of FIGS. 10 and 11.
Figure 13:
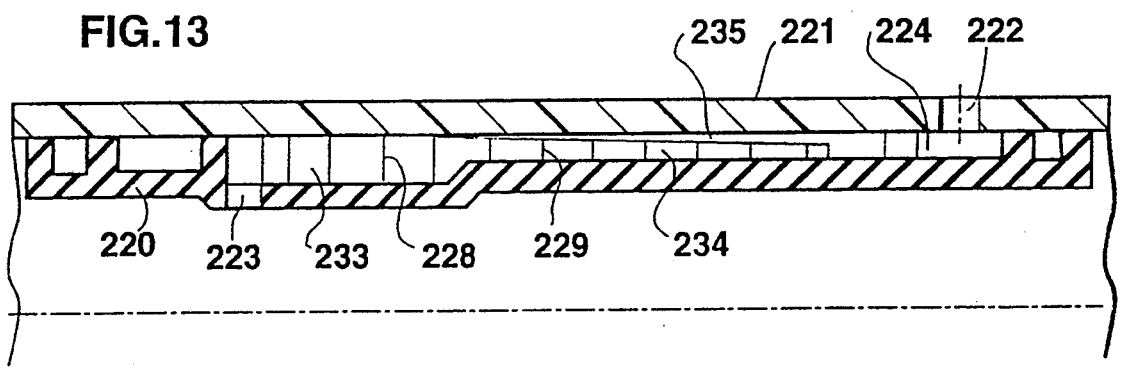

FIGS. 9a–9c illustrate a construction also similar to that of FIGS. 1–5, except in this case the baffles 129 corresponding to baffles 29 in FIGS. 1–5, are all of the same thickness, but the housing wall section 130b on which they are formed diverges with respect to the membrane 131 in the direction of the housing outlet opening 124 so that they also form clearances 135 with respect to the membrane 131 which increase in length towards the housing outlet opening 124. As shown in FIGS. 9a–9c, such an emitter construction is also effective to sequentially close the clearances 135 between the baffles 129 and the membrane 131 with increasing inlet pressure, thereby increasing the resistance imposed by the baffles 129 in labyrinth 134 to the flow of the water to the outlet opening 124 with increasing pressure.

In all other respects, the emitters illustrated in FIGS. 6–8 and 9a–9c are constructed and operate in the same manner as described above with respect to FIGS. 1–5.

FIGS. 10–13 illustrate a drip irrigation emitter of the cylinder type constructed in accordance with the present invention. In this construction, the emitter unit or housing 220, of cylindrical configuration, is of rubber and is bonded to the inner surface of the water supply tube 221. It is formed with an inlet opening 223 communicating with the interior of the water supply tube, and an outlet chamber 224 communicating with the outlet opening 222 formed through the water supply tube. The outer surface of the cylindrical housing 220 is formed with the two groups of baffles, namely baffles 228 adjacent to the inlet opening 223, and baffles 229 adjacent to the outlet chamber 224. Thus, baffles 228 are of equal thickness and extend across the complete space between the inner surface of the tube 221 and the outer surface of the cylinder emitter unit 220, to define a labyrinth 233 of fixed resistance to flow. Baffles 229, however, decrease in thickness in the direction towards the outlet chamber 224; they therefore produce, with the inner surface of tube 221, clearances 235 of increasing height in the direction of the outlet chamber; and thereby define a labyrinth 234 having a resistance to flow which varies with the inlet pressure.

In the constructions illustrated in FIGS. 1–5, 6–8 and 9a–9c, the baffles are formed in a wall (30, 130), which remains fixed, whereas the opposed passageway wall (membrane 28 or 128) is displaced with increasing pressures. In the construction illustrated in FIGS. 10–13, however, the baffles 229, being formed on the outer surface of the rubber cylinder housing 220, are displaced with increasing pressure towards the inner surface of the tube 221, to thereby sequentially close the clearances between those baffles and the housing wall with increasing pressure. In all other respects, the emitter illustrated in FIGS. 10–13 operates in substantially the same manner as described above.

Figure 14:
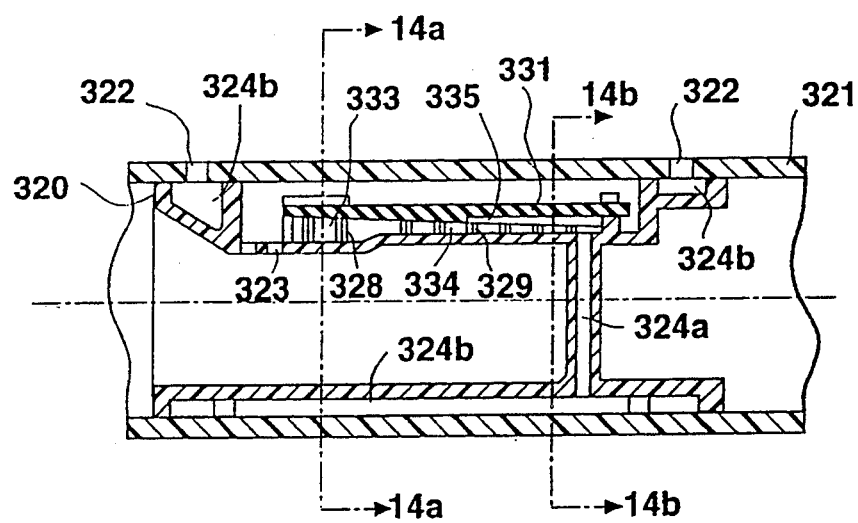
FIG. 14 is a longitudinal sectional view illustrating another drip irrigation emitter constructed in accordance with the present invention.
Figure 14A:
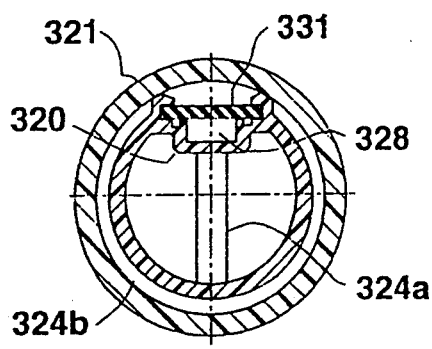
FIGS. 14a and 14b are longitudinal sectional views along lines 14a and 14b of FIG. 14.
Figure 14B:
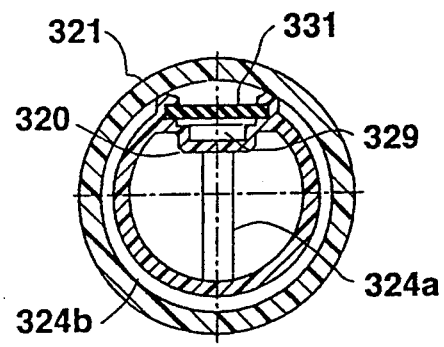

FIG. 14 illustrate a construction similar to that of FIGS. 10–13, except that the emitter unit or housing 320 is made of rigid material and cooperates with an elastomeric membrane 331 to define the labyrinth between the inlet opening 323 communicating with the inlet pressure, and the outlet includes a diametrically-extending tube 324a and an annular chamber 324b communicating with two outlet openings 322 in the water supply tube 321. In the construction illustrated in FIG. 14, the baffles 328 are of equal thickness to define a labyrinth 333 of fixed resistance to flow, whereas the baffles 329 are of decreasing thickness to form the clearances 335 of increasing heights in the direction of the outlet tube 324a, and thereby to define a labyrinth 334 having a pressure-variable resistance to flow. The arrangement is such that an increase in the inlet pressure, which is applied to the outer surface of the rubber membrane 331, deflects that membrane to successively close these clearances, and thereby to successively cause the baffles 329 to change the resistance to flow through labyrinth 334 in the same manner as described above.

FIG. 15 illustrates a construction similar to that of FIG. 14, except in this case the elastomeric membrane 431 is provided on the inner surface of the cylindrical housing 420, rather than on its outer surface as in FIG. 14. Accordingly, in the construction illustrated in FIG. 15, the inner surface of the cylindrical housing 420 would be formed with the baffles 428 defining the fixed-resistance labyrinth 433, and also with the baffles 429 defining the labyrinth 434 of pressure-variable resistance.

FIGS. 16–18 illustrate the invention incorporated in a button-type emitter, wherein the housing 520 is constituted of a first part 520a including the inlet opening 523 formed in a nipple connector, and a second part 520b including the outlet opening 524. Part 520b is formed on its inner surface with recesses defining the large baffles 528 communicating with the inlet opening 523, and with the smaller baffles 529 communicating with the outlet opening 524. The two parts are clamped together with an elastomeric membrane 531 in between the two parts, such that the membrane cooperates with baffles 528 to form labyrinth 533, and also cooperates with the baffles 529 to form labyrinth 534. As described in the other embodiments, baffles 528 are of equal thickness and extend transversely across the complete space between housing part 520b and membrane 531 so that labyrinth 533 imposes a fixed resistance to the flow between the inlet 523 and the outlet 524. However, baffles 529 are of decreasing thickness so that they define, with membrane 531, clearances 535 of increasing heights towards the outlet opening 524, and thereby the labyrinth 534 having a pressure-variable resistance to flow of the water between the inlet 523 and the outlet 524.

Many other variations, modifications and applications of the invention may be made.

What is claimed is:

1. A regulated flow restrictor device particularly useful as a drip irrigation emitter, comprising:

a housing having an inlet opening connectible to a source of pressurized fluid, an outlet opening, and a passageway including first and second opposed walls connecting the inlet opening to the outlet opening;

one of said walls being displaceable towards and away from the other wall;

and a plurality of baffles extending transversely of, and longitudinally spaced between, said first and second walls to define a flow-restrictor imposing a resistance to the flow of the fluid through said passageway in order to restrict the flow therethrough;

said baffles defining clearances with said passageway walls, which clearances, by the displacement of said displaceable wall, vary the resistance of the flow of the fluid through said passageway in response to variations in the pressure of said pressurized fluid;

characterized in that said clearances are of increasing height in the direction from one of said openings towards the other of said openings such that the clearances are sequentially closed with increasing pressure of said pressurized fluid to maintain a substantially uniform flow to and through the housing outlet opening in response to variations in the pressure of said pressurized fluid.

2. The device according to claim 1, wherein said clearances are of increasing height in the direction from said housing inlet opening towards said housing outlet opening, so as to be sequentially closed with increasing pressure of said pressurized fluid to maintain a substantially uniform flow to and through the housing outlet opening.

3. The device according to claim 1, wherein said baffles are carried by said first passageway wall and terminate short of said second passageway wall to define said clearances.

4. The device according to claim 3, wherein said second passageway wall is displaceable with respect to said first passageway wall and said baffles carried thereby in response to variations in the pressure at said housing inlet.

5. The device according to claim 4, wherein said second passageway wall is an elastomeric membrane.

6. The device according to claim 5, wherein said housing is formed with a longitudinally-extending cavity occupied by said baffles; said elastomeric membrane being secured along its opposite edges to opposite sides of said cavity such that the mid-portion of the membrane overlies said baffles and defines said clearances with respect thereto.

7. The device according to claim 3, wherein said first passageway wall, together with the baffles carried thereby, is displaceable with respect to said second passageway wall in response to variations in pressure at said housing inlet opening.

8. The device according to claim 7, wherein said first passageway wall and said baffles carried thereby are made of an elastomeric material.

9. The device according to claim 1, wherein said first and second passageway walls are Substantially parallel to each other, and said baffles are of varying thicknesses to define said clearances of increasing height.

10. The device according to claim 1, wherein said first and second passageway walls diverge away from each other in the direction of said housing outlet opening to define said clearances of increasing height.

11. The device according to claim 1, wherein said housing is attached to a tube connectible to said source of pressurized fluid, such that said inlet opening communicates with said pressurized fluid and said outlet opening communicates with an outlet opening formed in said tube.

12. The device according to claim 11, wherein said housing is in the form of a cylinder and extends circumferentially around the inner surface of the tube.

13. The device according to claim 12, wherein said cylinder includes an outer surface defining said passageway with the inner surface of the tube, said outer surface of the cylinder being formed with said baffles defining said clearances with respect to the inner surface of the tube, said outer surface of the cylinder being displaceable with respect to the inner surface of the tube for successively closing said clearances with increasing inlet pressure.

14. The device according to claim 12, wherein said cylinder includes an outer surface formed with said baffles, and wherein said displaceable passageway wall is a resilient membrane carried on the outer surface of said cylinder.

15. The device according to claim 1, wherein said housing includes:
a first part formed with said inlet opening receivable in an opening in a tube;
a second part formed with said outlet opening and attachable to said first part;
one of said parts being formed with recesses defining said baffles between said first and second parts when attached together;
and an elastomeric membrane interposed between one of said parts and said baffles and defining at least a part of said first passageway wall forming said clearances with respect to said baffles.

16. A regulated flow restrictor device particularly useful as a drip irrigation emitter, comprising:
a housing having an inlet connectible to a source of pressurized fluid, an outlet, and a passageway including first and second opposed walls connecting the inlet to the outlet;
a plurality of baffles extending transversely of, and longitudinally spaced between, said first and second walls to define a flow-restrictor imposing a resistance to the flow of fluid through said passageway;
said baffles being carried by said first passageway wall and terminating short of said second passageway wall to define clearances therebetween;
said second passageway wall being an elastomeric membrane which is displaceable with respect to said first passageway wall and said baffles carried thereby in response to variations in the pressure at said housing inlet;
said housing being formed with a longitudinally-extending cavity occupied by said baffles; said elastomeric membrane being secured over said cavity such that the membrane overlies said baffles and defines clearances with respect thereto;
said housing being formed at said opposite sides of the cavity with longitudinally-extending edges to which the opposite edges of the membrane are secured, said housing being further formed with an inclined surface inclined from each of said longitudinally-extending edges towards said cavity such that the complete membrane between said opposite edges thereof is initially displaceable towards said baffles until contacting said inclined surfaces, and then only the portion thereof between said inclined surfaces is displaceable towards said baffles.

17. The device according to claim 16, wherein the outer edge of the baffle having the smallest clearance is located at the inner edge of said inclined surface adjacent said cavity.

18. A regulated flow restrictor device particularly useful as a drip irrigation emitter, comprising:
a housing having an inlet connectible to a source of pressurized fluid, an outlet, and a passageway including first and second opposed walls connecting the inlet to the outlet;
a plurality of baffles extending transversely of, and longitudinally spaced between, said first and second walls to define a flow-restrictor imposing a resistance to the flow of the fluid through said passageway;
and pressure-responsive means for controlling the resistance of said flow restrictor to the flow of the fluid therethrough in response to variations in the pressure of the fluid at said housing inlet;
said pressure-responsive means including clearances between said baffles and one of said passageway walls, and means for effecting relative displacement between said one passageway wall and said baffles to increase or decrease said clearances, and thereby to vary the resistance of said flow restrictor to the flow of fluid therethrough in response to variations in the pressure of the fluid at the housing inlet;
said plurality of baffles defining a first labyrinth, said passageway including a second labyrinth defined by another plurality of baffles extending transversely of, and longitudinally spaced between, said first and second passageway walls, said second labyrinth being at the inlet side of said first labyrinth, and the baffles of said second labyrinth extending completely across said first and second passageway walls such that the resistance to the flow of the fluid imposed by said second labyrinth is not affected by variations in the pressure at the housing inlet.

19. The device according to claim 18, wherein the cross-sectional area of said passageway occupied by said second labyrinth is larger than that occupied by said first labyrinth.

20. The device according to claim 18, wherein said clearances are sequentially closed with increasing pressure at the housing inlet to maintain a substantially uniform flow to and through the housing outlet in response to variations in the pressure of the fluid at said housing inlet.

* * * * *